United States Patent
Larsson (10) Patent No.: US 8,503,508 B2
(45) Date of Patent: Aug. 6, 2013

(54) METHOD AND ARRANGEMENT FOR IMPROVED G-RAKE SCALING PARAMETER ESTIMATION

(75) Inventor: Erik Larsson, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 278 days.

(21) Appl. No.: 12/743,727

(22) PCT Filed: Nov. 23, 2007

(86) PCT No.: PCT/EP2007/062749
§ 371 (c)(1),
(2), (4) Date: May 19, 2010

(87) PCT Pub. No.: WO2009/065446
PCT Pub. Date: May 28, 2009

(65) Prior Publication Data
US 2010/0254436 A1 Oct. 7, 2010

(51) Int. Cl.
*H04B 1/00* (2006.01)
(52) U.S. Cl.
USPC ............ 375/148; 375/130; 375/150; 375/316
(58) Field of Classification Search
USPC .................................. 375/148, 150, 130, 316
See application file for complete search history.

(56) References Cited

U.S. PATENT DOCUMENTS

| | | | |
|---|---|---|---|
| 2005/0201447 A1* | 9/2005 | Cairns et al. | 375/148 |
| 2006/0251156 A1* | 11/2006 | Grant et al. | 375/148 |
| 2007/0189364 A1 | 8/2007 | Wang et al. | |

FOREIGN PATENT DOCUMENTS

WO 2005/096518 A1 10/2005

OTHER PUBLICATIONS

Bottomley, G. E. et al, "A Generalized RAKE Receiver for Interference Suppression." IEEE Journal on Selected Areas in Communications, vol. 18, No. 8, Aug. 2000.

* cited by examiner

*Primary Examiner* — Leila Malek
(74) *Attorney, Agent, or Firm* — Coats & Bennett, P.L.L.C.

(57) ABSTRACT

The present invention discloses a method of improved impairment covariance matrix estimation for a received signal in a Generalized Rake receiver arrangement. The method comprises providing for a plurality of despread pilot symbols representative of the signal and determining an estimate of an impairment covariance matrix R for the received signal. Subsequently, providing an estimate of scaling parameters $\alpha$, $\beta$ for the estimate of R by means of a weighted least squares estimate based on the color of a residual noise vector for the impairment covariance matrix estimate R, and forming an improved estimate of the impairment covariance matrix based on the weighted squares estimate.

12 Claims, 4 Drawing Sheets

METHOD AND ARRANGEMENT FOR IMPROVED G-RAKE SCALING PARAMETER ESTIMATION

TECHNICAL FIELD

The present invention relates to telecommunication systems in general, specifically to an improved G-Rake method and arrangements in such a system.

BACKGROUND

Telecommunication systems utilizing Wideband Code Division Multiple Access (WCDMA) continues to evolve to support high-bit rate applications. As the demand for higher data rates increases, however, greater self-interference from the dispersive radio channel limits performance. Consequently, advanced receivers for WCDMA terminal platforms and base stations have been and are continuously being developed.

Signals transmitted in a wireless communication system such as a Code Division Multiple Access (CDMA) or Wideband CDMA (WCDMA) system are subjected to multiple sources of interference and noise as they propagate via radio channels. The interference and noise components that affect signal transmission and reception in a wireless communication system are broadly referred to as impairments. Certain types of impairments may be correlated. That is, two seemingly independent signal impairments may in fact be related, and thus are said to be correlated. Some conventional receiver types such as the Generalized-RAKE (G-RAKE) receiver, see e.g. [1]-[3], and its Chips Equalizer (CEQ) counterpart use knowledge of impairment correlations to improve received signal quality. G-Rake receivers and CEQs also use an estimate of a multipath fading channel response in their received signal processing.

For example, a G-Rake receiver includes various signal "fingers" where each finger has an assigned path delay for receiving a particular image of a multipath signal and a correlator for despreading the received image. In combination, the signal fingers de-spread multiple signal images of a received multipath signal, this utilizing the multipath channel dispersion phenomenon. Additional "probing" fingers may be placed off path delays for capturing impairment correlations information. The finger outputs are weighted and coherently combined to improve received signal demodulation and/or received signal quality reception estimation, e.g. signal-to-interference (plus noise) (SIR) estimation. The processing weights assigned to the finger outputs are conventionally a function of the channel response and impairment correlations. As such, knowledge of signal impairments may be used to improve received signal processing. In a similar manner, CEQs utilize impairment correlations information for improving received signal processing where the selection of equalization filter taps in a CEQ is comparable to the placement of fingers in a G-Rake receiver and the generation of equalization filter coefficients is comparable to the generation of G-Rake combining weights.

Parametric G-Rake receivers estimate impairment correlations using a modeling approach. The model employs parameters, sometimes referred to as fitting parameters that can be estimated in a number of ways such as least-squares fittings. The parametric impairment correlations modeling process depends on corresponding model fitting parameters and on estimates of the channel response. However, signal impairments affect the channel response estimation process, particularly when the impairments are severe. As such, impairment correlation estimation and channel response estimation may be interdependent, particularly when interference is severe.

One specific type of receiver that has been developed is the so-called Rake receiver and the subsequently evolved Generalized-Rake or G-Rake receiver. In a Rake receiver signal energy is collected from different delayed versions of a transmitted signal. The channel response generates multiple images of the transmitted signal (that is the dispersive, multipath channel gives rise to different versions). The "fingers" of the Rake receiver extract signal energy from delayed signal images by despreading and combining them. The Rake receiver coherently combines the finger outputs using complex conjugates of estimated channel coefficients to estimate the modulation symbol. Each despread value consists of a signal component, an interference component, and a noise component. When combining the values the Rake receiver aligns the signal components so that they add to one another, creating a larger signal component.

A G-Rake receiver operates in a similar, but slightly different manner. The G-Rake receiver uses fingers and combining techniques to estimate a symbol. However, the G-Rake uses extra interference fingers to collect information about interference on the signal fingers. This interference might result from other symbols of interest (self-interference) or symbols intended for other users in the cell (own-cell interference) or symbols intended for other users in other cells (other-cell interference). The extra fingers capture information about the interference. This is used to cancel interference on the signal fingers. In addition, a separate procedure is used to form combining weights. Rake receivers use a weighted sum of despread values to estimate symbols. Despread values are thus combined using combining weights. Besides estimating the channel, the G-Rake estimates the correlations between the impairment (interference plus noise) on different fingers. The correlation captures the "color" of the impairment. This information can be used to suppress interference. Channel estimates and impairment correlation estimates are used to form the combining weights. As a result, the combining process collects signal energy and suppresses interference. The G-Rake receiver combines two despread values to cancel interference and increase the signal component. By contrast, the Rake receiver solely maximizes the signal component.

In order to remain competitive on the market, WCDMA systems are constantly evolving and striving for higher bit rates. In order to achieve this, concepts like higher order modulation and MIMO are considered. However, to be able to benefit from all these new features better signal to noise ratio (SNR) conditions are required. Consequently, it is common for telecommunications systems to operate at significantly higher $E_c/N_0$ regions, which make the interference situation more severe. Hence, in order to achieve the desired targets a good G-Rake becomes essential. Unfortunately, when moving to these higher $E_c/N_0$ regions the implementation of the G-Rake becomes more sensitive, and the current G-Rake algorithm is in general not good enough. In particular, we need to improve the channel estimation procedure and especially the estimation of the covariance matrix required in the G-Rake.

SUMMARY

According to a basic aspect, the present invention enables an improved telecommunication system.

According to a further aspect, the present invention enables an improved receiver in a telecommunication system.

According to a further aspect, the present invention enables an improved G-Rake receiver.

According to a further aspect, the present invention enables a G-Rake receiver with improved interference suppression.

In general, the present invention comprises a method of improved estimation of an impairment covariance matrix of a received signal in a G-Rake receiver arrangement. The method comprises the steps of providing S10 a plurality of despread pilot symbols of the received signal and determining S20 an initial estimate of the impairment covariance matrix for the signal. Subsequently, providing S30 scaling parameter estimates $\alpha$, $\beta$ for the determined estimate by a weighted least squares estimate based on the residual noise vector of the estimate, and finally forming an improved estimate of the impairment covariance matrix based on the weighted least squares estimate of the scaling parameters.

According to a further embodiment, the weighted least squares estimate further utilizes information relating to the color of the residual noise vector.

Advantages of the present invention include a G-Rake with improved performance at high SNR;

a G-Rake with improved scaling parameter estimation.

BRIEF DESCRIPTION OF THE DRAWINGS

The invention, together with further objects and advantages thereof, may best be understood by referring to the following description taken together with the accompanying drawings, in which.

ABBREVIATIONS

| | |
|---|---|
| CPICH | Common Pilot Channel |
| CQI | Channel Quality Indicator |
| CRB | Cramér-Rao Bound |
| DPCCH | Dedicated Physical Control Channel |
| G-Rake | Generalized Rake |
| HOM | Higher Order Modulation |
| HSPA | High Speed Packet Access |
| MIMO | Multiple Input Multiple Output |
| ML | Maximum Likelihood |
| MMSE | Minimum Mean Square Error |
| SINR | Signal-to-Interference-plus-Noise Ratio |
| SNR | Signal-to-Noise Ratio |
| TPC | Transmit Power Control |
| WCDMA | Wideband Code Division Multiple Access |

DETAILED DESCRIPTION

Figure 1:
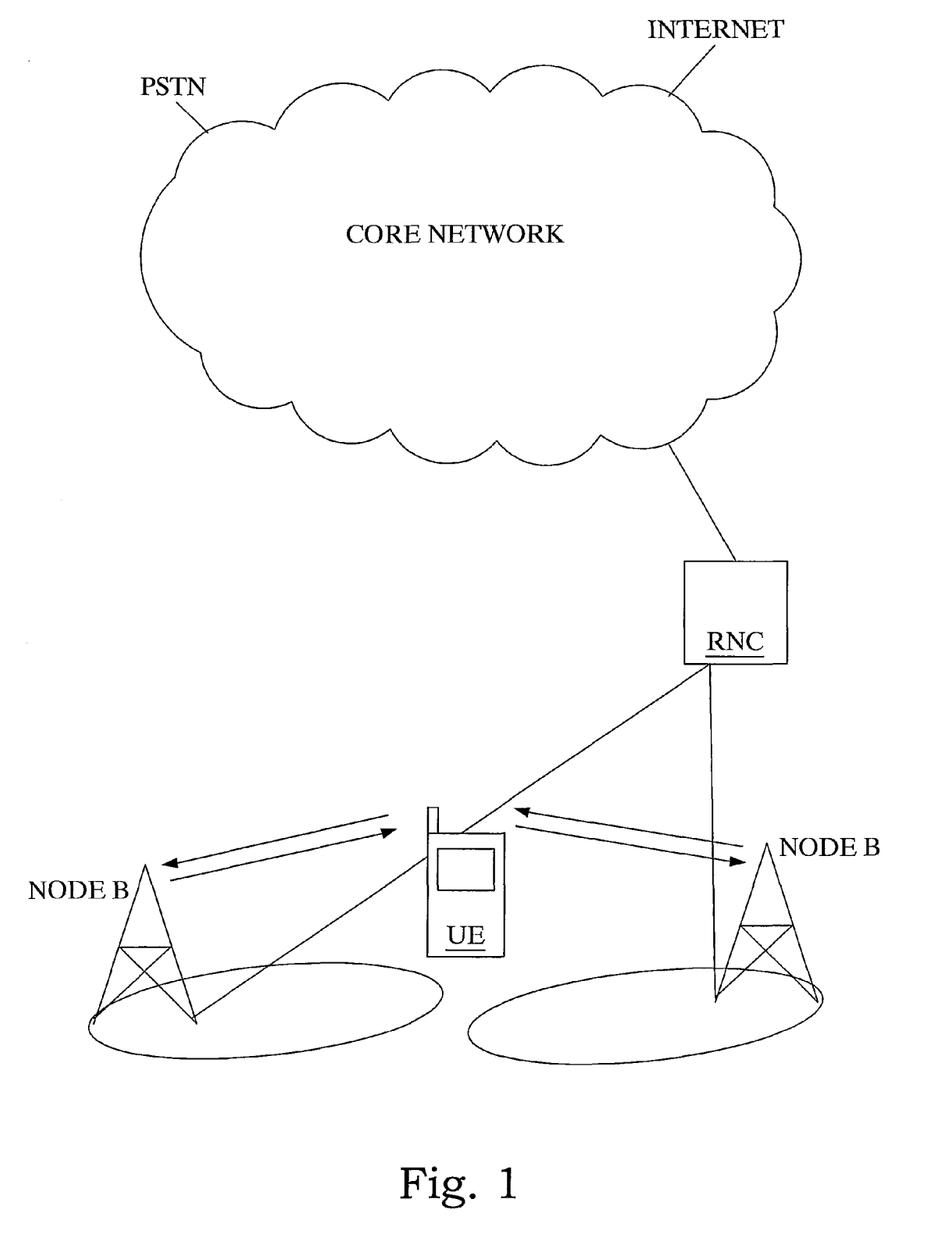
FIG. 1 is a general communication system.

Embodiments of the present invention will be described in the context of a general telecommunication system utilizing Wideband Code Division Multiple Access (WCDMA). Such a system is illustrated in FIG. 1. A mobile terminal or user equipment (UE) communicates with one or several Node Bs. The term Node B refers to a logical node, responsible for physical layer processing such as error detection coding, modulation and spreading, as well as conversion from baseband to the radio-frequency signal transmitted from the antenna. A Node B is handling transmission and reception in one or several cells. Every Node B is connected to a Radio Network Controller (RNC). The RNC controls one or normally several Node Bs. The RNC, among other things, is in charge of call setup, quality-of-service handling, and management of the radio resources in the cells for which it is responsible. Most of the "intelligence" in a radio-access network is located in the RNC, while the Node Bs mainly act as modems. For high speed packet access (HSPA) the Node B further deals with channel dependent scheduling and link adaptation. Finally, the RNC is connected to the Internet and the traditional wired telephony network through the core network.

In order to enable an in-depth understanding of the merits of the present invention, a brief description of the concept of G-Rake receivers and particularly parametric G-Rake receivers follows below.

Parametric G-Rake receivers estimate impairment correlations using a modeling approach. The model employs parameters, sometimes referred to as fitting parameters that can be estimated in a number of ways such as least squares fittings. The parametric impairment correlations modeling process depends on corresponding model fitting parameters and on estimates of the channel response. However, signal impairment affects the channel response estimation process, particularly when the impairments are severe. As such, impairment correlation estimation and channel response estimation may be interdependent, particularly when interference is severe.

The G-Rake receiver is extensively used in communication systems, for example WCDMA, as an important means to provide interference suppression at moderate to high data rates. As such, the G-Rake tries to balance interference suppression and channel equalization by taking the so-called color of the impairment covariance matrix into account when forming the combining weights. To be more specific, the G-Rake combining weights w are found by solving the following system of linear equations $$Rw = h \quad (1)$$

where R is the total impairment covariance matrix and h is the net channel response vector, see [2]. For the basic parametric G-Rake it holds that R can be modeled as follows:

$$R = \alpha R_I(g) + \beta R_n \quad (2)$$

where g is the medium channel response, $R_I$ spawns from interference, $R_n$ corresponds to a white Gaussian noise source (used to model the aggregate of all un-modeled signal sources), and $\alpha$, $\beta$ are the so-called scaling/fitting parameters. The scaling parameters are in general unknown and these values can also change quite rapidly over time. Consequently, in practice the scaling parameters $\alpha$, $\beta$ need to be estimated. This estimation problem, which needs to be accurate to achieve good G-Rake performance, suffers from several weaknesses.

In the baseline G-Rake, $\alpha$, $\beta$ are estimated by using a least squares methodology according to the relation of Equation 3

$$\hat{R}_m = \alpha R_I(\hat{g}) + \beta R_n \quad (3)$$

where $\hat{g}$ is an estimate of the medium channel response, and $\hat{R}_m$ is an estimate of the impairment covariance matrix. The latter is commonly obtained using N despread pilot symbols according to Equation 4.

$$\hat{R}_m = \frac{1}{N-1} \sum_{k=1}^{N} (y_k - \hat{h})(y_k - \hat{h})^H \qquad (4)$$

where $\hat{h}$ is obtained via averaging of the N despread pilot symbols $$\hat{h} = \frac{1}{N} \sum_{k=1}^{N} y_k \qquad (5)$$

Notice also that the scaled medium channel g can be obtained from the estimate of h by observing that the despread pilot channel (e.g. dedicated physical control channel (DPCCH) or common pilot channel (CPICH)) can be written as $$y_k = h + n_k = \sqrt{E_p} A g + n_k \qquad (6)$$

where $n_k$ is assumed to be white Gaussian noise with covariance matrix $$R = E_c R_I(g) + N_0 R_n \qquad (7)$$

Here $E_c$ is the total chip energy, $E_p$ denotes the pilot symbol energy, $N_0$ represents the variance of the white noise source, and A is a matrix that depends on the pulse shape autocorrelation function, the path delays and the finger delays. Notice also that it is common to consider the scaled medium channel $g = \sqrt{E_p} g$ when discussing the G-Rake parameter estimation problem.

Obviously, there exist different variations of the G-Rake, in which different approaches to obtain the required G-Rake components are employed. For example, the medium channel $\hat{g}$ can be obtained using least squares, maximum likelihood, or minimum mean square error criterions.

Two related and very important problems when discussing the G-Rake and combining weight estimation are channel quality indicator (CQI) and transmit power control (TPC). Both these concepts need an estimate of the SNR or signal to interference plus noise ratio (SINR). For the G-Rake a formulation of the SINR can be written as $$SINR = h^H R^{-1} h \qquad (8)$$

which indicates that an accurate estimate of R is essential for good CQI and TPC performance.

Figure 2:
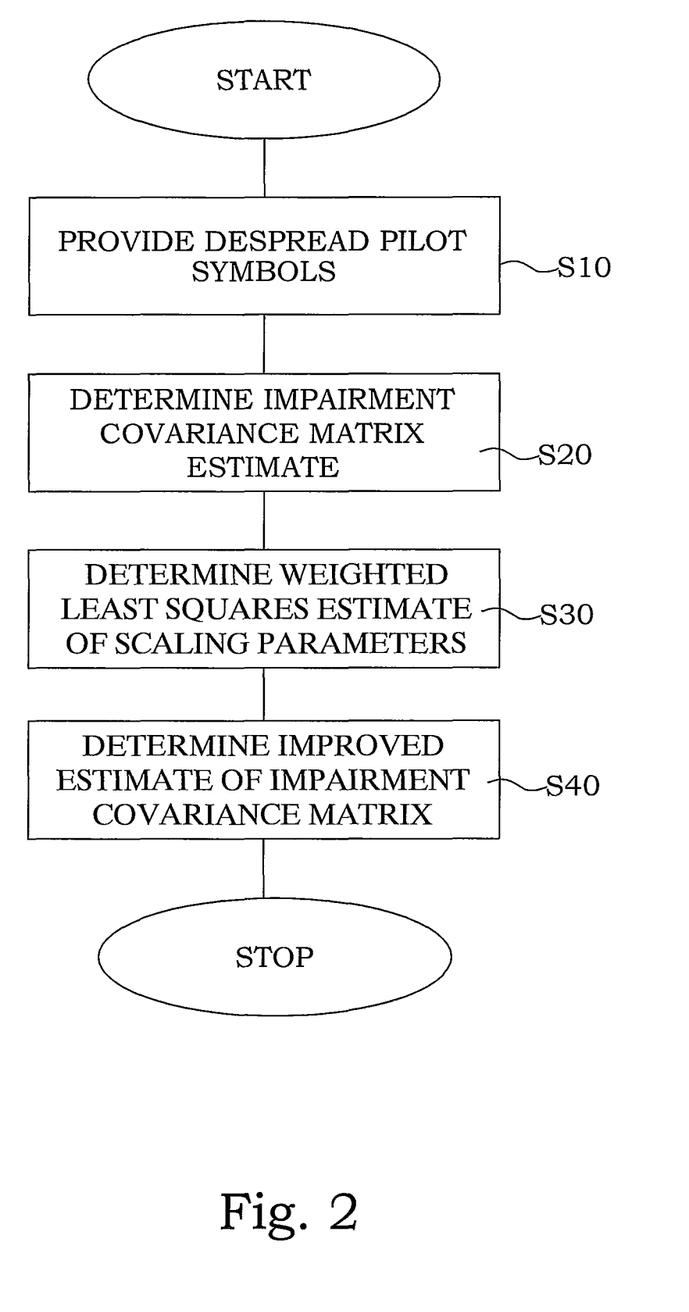
FIG. 2 is a schematic flow chart of an embodiment of a method according to the present invention.

With reference to FIG. 2, the present invention basically comprises providing S10 a plurality N of pilot symbols of a received signal and determining S20 an initial estimate $\hat{R}_m$ of an impairment covariance matrix R for the received signal. Subsequently, scaling parameters $\alpha$ and $\beta$ for the estimated $\hat{R}_m$ impairment covariance matrix are estimated utilizing a weighted least squares estimate S30 based on a residual noise vector $\epsilon$ for the estimate $\hat{R}_m$. Finally, an improved estimate of the impairment covariance matrix is provided S40 based on the weighted least squares method.

The main idea of the present invention is thus to extend a current G-Rake algorithm structure to include a more accurate estimate of the covariance matrix R at the cost of a moderate increase in computational complexity. In particular, a solution to the problem of estimating the scaling parameters $\alpha$ and $\beta$ is further developed. Consequently, the present invention discloses an algorithm that significantly increases the accuracy of $\alpha$ and $\beta$ estimates, particularly at high $E_c/N_0$ regions. In order to keep the computational complexity within reason, the disclosed embodiments all utilize a least squares framework. However, it is evident that also other estimates can be utilized with minor modifications of the present invention.

In essence, the improved estimate of the scaling parameters $\alpha$ and $\beta$, according to the present invention, all rely on the same principle as a G-Rake. Similarly as the G-Rake takes the color of the impairment covariance matrix into account, the disclosed scheme for estimating $\alpha$ and $\beta$ will benefit from knowledge about the color of the residual error in the least squares regression model.

In order to ease the presentation, a single antenna scenario and a real valued medium channel g are assumed. Consequently, all involved quantities of the disclosure are real valued in the current embodiment. However, it is equally possible to implement the present invention on multiple antenna scenarios and complex valued medium channels.

Initially the relation for a parametric G-Rake model according to $$R = \alpha R_I(g) + \beta R_n \qquad (9)$$

is further explored. This expression can be written in the classic regression form according to $$r = \Phi \theta \qquad (10)$$

where $$r = \begin{bmatrix} e_1^T R e_1 \\ \vdots \\ e_i^T R e_j \end{bmatrix}, \Phi = \begin{bmatrix} e_1^T R_I(g) e_1 & e_1^T R_n e_1 \\ \vdots & \vdots \\ e_i^T R_I(g) e_j & e_i^T R_n e_j \end{bmatrix}, \text{ and } \theta = \begin{bmatrix} \alpha \\ \beta \end{bmatrix}. \qquad (11)$$

Here $e_i$ is the zero vector with a 1 at the i:th position, meaning that $e_i^T X e_j$ represents the (i,j) element of the matrix X. Consequently, it can be seen that in general not all equation elements from (9) need to be used when forming (10). Exactly which equation elements to use is typically implementation specific. However, it is common to include the main diagonal and possibly some of the off-diagonal elements. Furthermore, it is assumed that the medium channel g includes a scaling factor, i.e. $g = \sqrt{E_p} g$ (see the discussion following Equation (6)). This means that the true scaling parameters are given by $$\alpha = E_c/E_p \text{ and } \beta = N_0 \qquad (12)$$

By using estimated quantities of R and g the following expression is obtained $$\hat{r} = \hat{\Phi} \theta + \varepsilon \qquad (13)$$

where $$\hat{r} = \begin{bmatrix} e_1^T \hat{R}_m e_1 \\ \vdots \\ e_i^T \hat{R}_m e_j \end{bmatrix}, \qquad (14)$$

$$\hat{\Phi} = \begin{bmatrix} e_1^T R_I(\hat{g}) e_1 & e_1^T R_n e_1 \\ \vdots & \vdots \\ e_i^T R_I(\hat{g}) e_j & e_i^T R_n e_j \end{bmatrix},$$

$$\varepsilon = (\hat{r} - r) - (\hat{\Phi} - \Phi) \theta$$

and $\epsilon$ is the residual noise vector for the model estimate.

In particular, assume that $\hat{R}_m$ is given by Equation 4. A known baseline least squares estimate of the scaling parameters is then given by $$\hat{\theta}_{LS}=(\hat{\Phi}^T\hat{\Phi})^{-1}\hat{\Phi}^T\hat{r} \quad (15)$$

However, as identified by the inventors, the residual noise vector $\epsilon$ in the model of Equation 13 is neither white nor has zero mean. In fact, the color becomes severe at high $E_c/N_0$ regions. Consequently, the baseline least squares approach may suffer from poor performance at high $E_c/N_0$ regions Consequently, the inventors have realized that in order to obtain an improved estimate of the impairment covariance matrix of the received signal at high $E_c/N_0$ regions it is necessary to take also the color of the residual noise vector into consideration.

Figure 3:
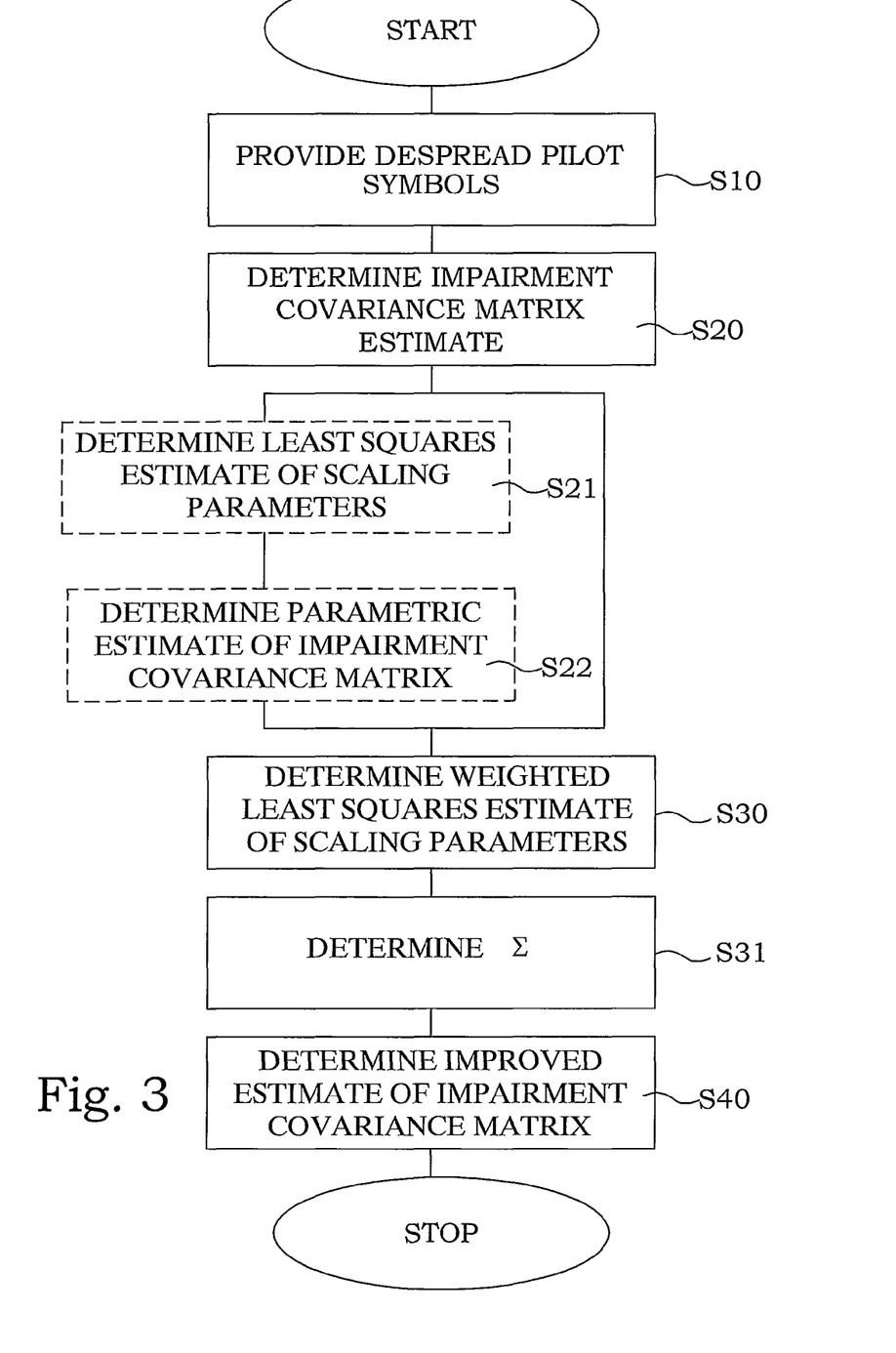
FIG. 3 is a schematic flow chart of a further embodiment of the present invention.

According to embodiments of the present invention, with specific reference to FIG. 3, as an alternative to the baseline least square estimate, the color of the residual noise vector will be taken into account. Therefore, according to an embodiment of the present invention, a parameter or matrix $\Sigma$ representative of the color of the residual noise vector is determined S31 or estimated. In mathematical terms the parameter or matrix $\Sigma$ represents an estimate of the second order momentum of the residual vector $\epsilon$. In principal, the parameter or matrix $\Sigma$ describe the correlation between the elements of the observation vectors $\hat{r}$ and $\hat{\Phi}$ of Equation 13, or rather the dependencies between the elements or observations of the model of Equation 10.

An estimate of $\theta$ is thus obtained S30 by a weighted least squares approach $$\hat{\theta}_{WLS}=(\hat{\Phi}^T\Sigma^{-1}\hat{\Phi})^{-1}\hat{\Phi}^T\Sigma^{-1}\hat{r} \quad (16)$$

where $\Sigma$ represents the correlation or interdependency between the observations according to $\hat{r}$ and $\hat{\Phi}$, where $\Sigma=E\{\epsilon\epsilon^T\}$. On a mathematical level this implies that the under certain assumptions this choice of $\Sigma$ minimizes the MSE ($\hat{\theta}$). However, from a more technical viewpoint Equation 16 represents a least squares method where the observations have been pre-filtered (or whitened). One way of describing this filter is by the so-called Cholesky-factorization of $\Sigma$.

According to a further embodiment of the present invention, instead of determining the actual $\Sigma$, which is impossible or at least very difficult, an approximate $\Sigma$ is used according to Equation 17

$$\Sigma \approx \text{cov}(\hat{r}) \quad (17)$$

A number of things are worth to point out. First, by using proper approximations it can be shown that this choice of $\Sigma$ will minimize the MSE of $\hat{\theta}$. Second, an expression for cov($\hat{r}$) is obviously needed to successfully implement Equation 16. However, from Equations (14) and (17), it follows that $$\Sigma \approx \begin{bmatrix} Ee_1^T(\hat{R}_m-R)e_1 e_1^T(\hat{R}_m-R)e_1 & \cdots & Ee_1^T(\hat{R}_m-R)e_1 e_1^T(\hat{R}_m-R)e_j \\ \vdots & \ddots & \vdots \\ Ee_i^T(\hat{R}_m-R)e_j e_1^T(\hat{R}_m-R)e_1 & \cdots & Ee_i^T(\hat{R}_m-R)e_j e_i^T(\hat{R}_m-R)e_j \end{bmatrix} \quad (18)$$

where, under the given assumptions, it holds that $$Ee_i^T(\hat{R}_m-R)e_j e_k^T(\hat{R}_m-R)e_r = \frac{1}{N-1}(e_i^T Re_q e_j^T Re_r + e_i^T Re_r e_q^T Re_j) \quad (19)$$

A further comment is that $\Sigma$ needs to be invertible. This should of course be checked in the implementation, and also be taken into account when choosing which matrix elements to include from (10) when forming (11). Nevertheless, given R it is now straightforward to construct the required matrices and obtain the weighted least squares estimate of the scaling parameters $\alpha$ and $\beta$.

The next and final problem is that $\Sigma$ is a function of R ($\Sigma=\Sigma(R)$) and that R is unknown (after all, the overall goal is to obtain an accurate estimate of R). However, this problem can be solved by using a two step approach. The algorithm can be summarized as follows, see also FIG. 3:

1) Estimate the (scaled) medium channel g, for instance via an estimate of the net channel h. Also, form S20 the non-parametric estimate (4) of R.
2) Using the estimate in step 1) estimate the scaling parameters S21 using the baseline least squares algorithm in Equation 15. By using the estimated scaling parameters build S22 a parametric estimate of R.
3) Use the baseline parametric estimate of R (from step 2) to form $\Sigma$. Then the weighted least square estimate is used to provide improved estimates S30 of the scaling parameter. Finally, rebuild S40 R using the improved scaling parameters.

Notice that step 2) is optional and can be avoided by using the non-parametric estimate in Equation 4 of R when forming $\Sigma$ in step 3. In this case, the weighted least squares method S30 is used directly to obtain the scaling parameters.

In conclusion:

The proposed weighted least squares scheme provides significantly improved estimates of the scaling parameters, especially at regions with high $E_c/N_0$, which are of importance when considering higher order modulation (HOM) or MIMO. Experience indicates that an improvement of the scaling parameters of the order of several magnitudes can be obtained. In fact, results indicate that the method according to the present invention yields results close to the Cramér-Rao Bound (CRB).

The increased performance comes at cost of a modest increase in computational power, since it is necessary to build and invert $\Sigma$. Also, two estimation steps are used even though the second step is optional and can be avoided.

The method according to the invention can be combined with other methods, and different embodiments can be envisioned. For example, the estimate of the channel can be obtained using maximum likelihood (ML) or minimum mean square error (MMSE). In addition, the improved estimate of the scaling parameters, which result in an improved estimate of the impairment covariance matrix R can be used to improve SINR estimates or TPC performance.

The method can be extended to handle complex valued channels (Rayleigh distributed) as well as to multi antenna scenarios, or even MIMO systems.

The framework disclosed in the present invention is in principle applicable to other receivers as well, e.g. GRAKE+ etc.

The above disclosed embodiments are preferably implemented in a GRAKE in a receiver in a telecommunication system. Consequently, it can be implemented in a user equipment such as a mobile phone or other mobile user equipment, or in a receiver in a Node B.

Figure 4:
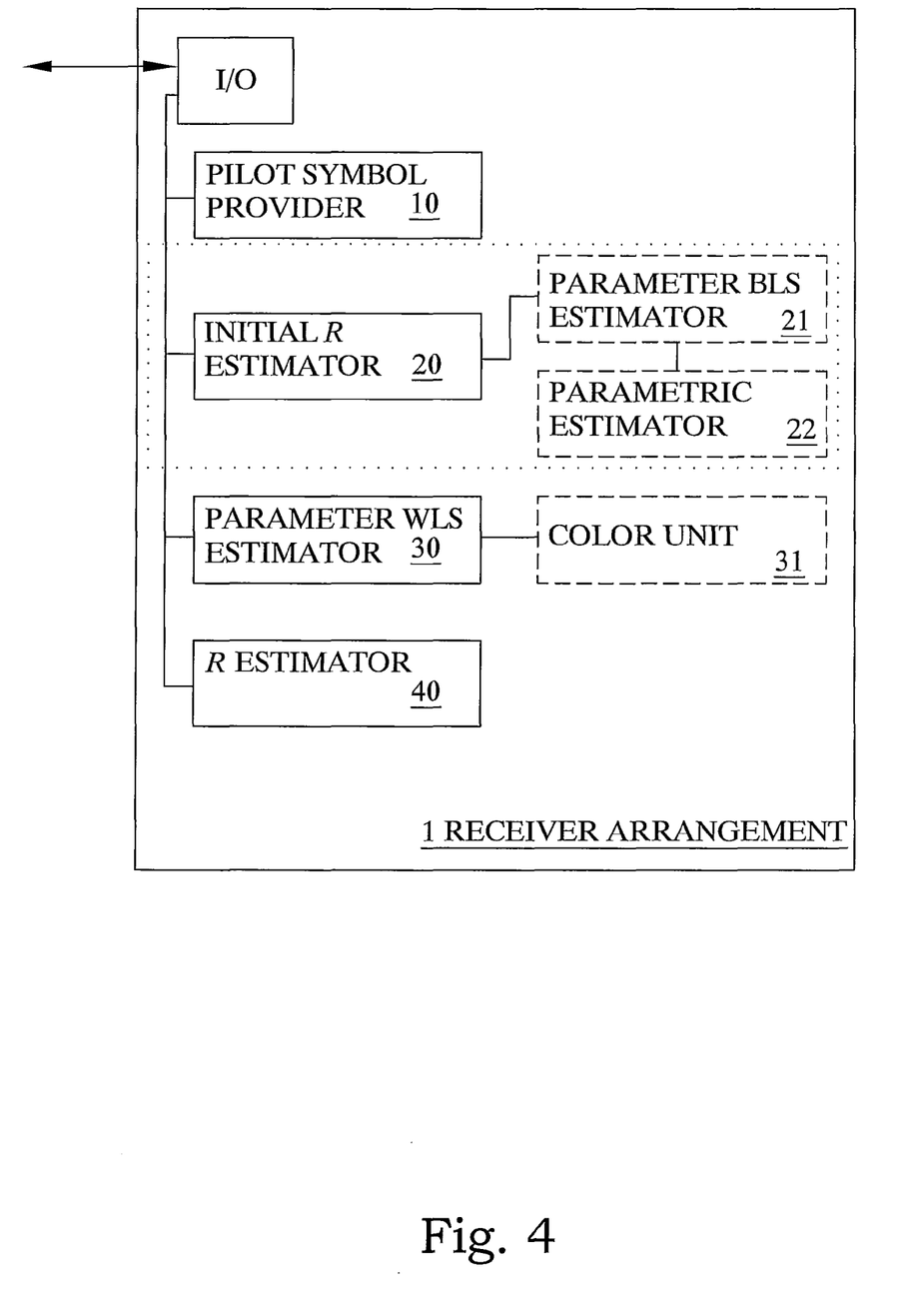
FIG. 4 is a schematic illustration of an embodiment of a receiver arrangement according to the present invention.

A receiver arrangement according to the present invention will be described below with reference to FIG. 4.

An embodiment of a receiver arrangement, e.g. a G-Rake receiver arrangement, is provided with a unit 10 for receiving and providing multiple despread pilot symbols representative of a signal received at the receiver arrangement. The receiver also comprises a unit 20 for estimating an impairment covariance matrix R for the received signal. In addition, the receiver comprises a unit 30 for estimating scaling parameters α, β for the previously estimated R by means of a weighted least squares estimate based on the color of a residual noise vector for the impairment covariance matrix estimate R, and a unit 40 forming an improved estimate of the impairment covariance matrix based on at least the weighted least squares estimate.

According to a further embodiment of the present invention, the arrangement also comprises a unit 31, indicated by the dotted box 31, for determining a parameter Σ representative of the color of the residual noise error vector of the estimated impairment covariance matrix. The color parameter is based on correlations between elements of the covariance matrix estimate. Consequently, the providing means 30 are further adapted to provide the weighted least squares estimate of the scaling parameters α, β for the impairment covariance matrix estimate R based on the determined color parameter.

The unit 20 for determining the initial estimation of the impairment covariance matrix R can be further adapted to determine the impairment covariance matrix R by forming a non-parametric estimate of said impairment covariance matrix R. In addition, the receiver arrangement comprises a unit 21 for calculating a baseline least squares estimate of the scaling parameters α, β based on an estimate of the medium channel and the non-parametric estimate of the impairment covariance matrix; and a unit 22 for determining a parametric estimate of the impairment covariance matrix based on the estimated scaling parameters. Consequently the providing unit 30 is further adapted to provide an improved estimate of scaling parameters α, β for the estimate R by means of the weighted least squares (WLS) estimate, and on the parametric estimate, and the forming unit 40 is adapted to form an improved estimate of the impairment covariance matrix based on the improved estimate for the scaling parameters.

The units 21 and 22 can be implemented as separate units or included in the unit 20 for estimating the initial estimate of the impairment matrix R, as indicated by the dotted box surrounding the units 20, 21, 22.

Advantages of the present invention comprise:
The purpose of the current invention is to increase the performance of the G-Rake at high SNR regions, which is essential in order to reach the desired targets when introducing concepts such as HOM and MIMO. In particular, we focus on the impairment covariance matrix and especially on how the estimate of the scaling parameters can be improved. This can have a profound impact, not only on the G-Rake combining weight calculation, but also when considering CQI estimates and TPC. The improved parameter quality comes at a modest cost of a slight increase in computational complexity.

It will be understood by those skilled in the art that various modifications and changes may be made to the present invention without departure from the scope thereof, which is defined by the appended claims.

REFERENCES

[1] C. Cozzo et. al., "Method and Apparatus for Scaling Parameter Estimation in Parametric Generalized Rake Receivers", Pub. No. US 2006/0007990 A1, 2006.

[2] G. E. Bottomley and T. Ottosson and E. Wang, "A Generalized RAKE Receiver for Interference Suppression", IEEE Journal on selected areas in communications, num 18(8): 1536-1545, 2000.

[3] D. Cairns et. al., "Method and Apparatus for Parameter Estimation in a Generalized Rake Receiver", Pub. No. US 2005/0201447 A1, 2005.

The invention claimed is:

1. A method implemented by a Generalized Rake (G-Rake) receiver for estimating an improved impairment covariance matrix, said method comprising:
providing a plurality of despread pilot symbols representative of a received signal received by the G-Rake receiver;
determining, by a processing circuit, an estimate of an impairment covariance matrix R for said received signal based on the plurality of despread pilot symbols;
determining an estimate of scaling parameters α, β for said estimate of R according to a weighted least squares estimate based on the color of a residual noise vector for said estimate of the impairment covariance matrix R, wherein said residual noise vector is determined based on the determined estimate of the impairment covariance matrix and the weighted least squares estimate, and
determining an improved estimate of said impairment covariance matrix based on at least said weighted least squares estimate.

2. The method according to claim 1, wherein said determining the estimate of scaling parameters includes:
determining a parameter Σ representative of the color of the residual noise vector of said estimated impairment covariance matrix, said color being based on correlations between elements of the estimated impairment covariance matrix; and
determining the weighted least squares estimate of said scaling parameters α, β for said estimate of the impairment covariance matrix R based on said determined parameter Σ.

3. The method according to claim 2, wherein said determining the estimate of the impairment covariance matrix R comprises determining a non-parametric estimate of said impairment covariance matrix R.

4. The method according to claim 3, wherein said determining the improved estimate of the impairment covariance matrix R includes:
determining a baseline least squares estimate of said scaling parameters α, β based on an estimate of a medium channel and said nonparametric estimate of the impairment covariance matrix; and
determining a parametric estimate of the impairment covariance matrix based on the estimated scaling parameters; and
determining an improved estimate of scaling parameters α, β for said estimate of the impairment covariance matrix R according to said weighted least squares estimate, and on said parametric estimate, and
determining the improved estimate of said impairment covariance matrix based on said improved estimate for said scaling parameters.

5. The method according to claim 2, further comprising determining the color parameter Σ such that it minimizes the weighted least squares estimate of the scaling parameters.

6. The method according to claim 2, further comprising estimating said color parameter Σ as the covariance value of the estimated impairment covariance matrix.

7. The method according to claim 1, wherein said weighted least squares estimate $\hat{\theta}_{WLS}$ of scaling parameters α, β is determined according to the expression:

$$\hat{\theta}_{WLS} = (\hat{\Phi}^T \Sigma^{-1} \hat{\Phi})^{-1} \hat{\Phi}^T \Sigma^{-1} \hat{r}$$

where $\Sigma$ is a value representative of the color of the residual noise vector $\epsilon$, and where $$\hat{r} = \begin{bmatrix} e_1^T \hat{R}_m e_1 \\ \vdots \\ e_i^T \hat{R}_m e_j \end{bmatrix}, \hat{\Phi} = \begin{bmatrix} e_1^T R_I(\hat{g}) e_1 & e_1^T R_n e_1 \\ \vdots & \vdots \\ e_i^T R_I(\hat{g}) e_j & e_i^T R_n e_j \end{bmatrix},$$

where i and j are integers, $e_i$ is a vector with a "1" at the i-th position, $e_i^T$ represents the transpose of $e_i$, $\hat{R}_m$ is the estimate of the impairment covariance matrix, $R_I$ represents interference covariance matrix and $R_n$ represents noise covariance matrix, and $\hat{g}$ represents medium channel response.

8. The method according to claim 2, further comprising determining a color parameter $\hat{\Sigma}$ as set forth below:

$$\Sigma = E\{\epsilon \epsilon^T\} \approx \text{cov}(\hat{r})$$

yielding $$\sum \approx \begin{bmatrix} E e_1^T (\hat{R}_m - R) e_1 e_1^T (\hat{R}_m - R) e_1 & \cdots & E e_1^T (\hat{R}_m - R) e_1 e_i^T (\hat{R}_m - R) e_j \\ \vdots & \ddots & \vdots \\ E e_i^T (\hat{R}_m - R) e_j e_1^T (\hat{R}_m - R) e_1 & \cdots & E e_i^T (\hat{R}_m - R) e_j e_i^T (\hat{R}_m - R) e_j \end{bmatrix}$$

and using $$E e_i^T (\hat{R}_m - R) e_j e_q^T (\hat{R}_m - R) e_r = \frac{1}{N-1} (e_i^T R e_q e_j^T R e_r + e_i^T R e_r e_q^T R e_j)$$

whereby $\sum = \sum(R)$ and $\hat{\sum} = \sum(\hat{R})$.

where E is an expectation operator, T represents transpose, and cov denotes a covariance matrix, whereby $\Sigma = \Sigma(R)$ and $\hat{\Sigma} = \Sigma(\hat{R})$, where $\epsilon$ represents the residual noise vector, where i, q, and j are integers, $e_i$ is a vector with a "1" at the i-th position, $e_i^T$ represents the transpose of $e_i$, N is the number of despread symbols, $\hat{R}_m$ is the estimate of the impairment covariance matrix, and $$\hat{r} = \begin{bmatrix} e_1^T \hat{R}_m e_1 \\ \vdots \\ e_i^T \hat{R}_m e_j \end{bmatrix}.$$

9. A receiver arrangement for improved impairment covariance matrix estimation for a received signal in a Generalized Rake (G-Rake) receiver arrangement, said receiver arrangement comprising one or more processing circuits including:
   a despreading unit for providing a plurality of despread pilot symbols representative of said received signal;
   a first covariance estimation unit for determining an estimate of an impairment covariance matrix R for said received signal based on the plurality of despread pilot symbols;
   a scaling parameter estimation unit for determining an estimate of scaling parameters α, β for said estimate of the impairment covariance matrix R according to a weighted least squares estimate based on the color of a residual noise vector for said estimate of the impairment covariance matrix R, wherein said residual noise vector is determined based on the determined estimate of the impairment covariance matrix and the weighted least squares estimate, and
   a second covariance estimation unit for determining an improved estimate of said impairment covariance matrix based on at least said weighted least squares estimate.

10. The receiver arrangement according to claim 9, further comprising color parameter estimation unit for determining a parameter $\Sigma$ representative of the color of the residual noise vector of said estimated impairment covariance matrix, said color being based on correlations between elements of the estimated covariance matrix, and wherein said scaling parameter estimation unit is configured to determine the weighted least squares estimate of said scaling parameters α, β for said estimate of the impairment covariance matrix R based on said determined parameter $\Sigma$.

11. The receiver arrangement according to claim 10, said first covariance estimation unit is configured to determine the estimate of impairment covariance matrix R by determining a non-parametric estimate of said impairment covariance matrix R.

12. The receiver arrangement according to claim 11, further comprising:
   a calculation unit for determining a baseline least squares estimate of said scaling parameters α, β based on an estimate of a medium channel and said non-parametric estimate of the impairment covariance matrix; and
   a parametric estimation unit for determining a parametric estimate of the impairment covariance matrix based on the estimated scaling parameters; and wherein
   said scaling parameter estimation unit is further adapted to determine an improved estimate of scaling parameters α, β for said estimate of the impairment covariance matrix R according to said weighted least squares estimate and said parametric estimate; and
   said second covariance estimation unit is adapted to determine an improved estimate of said impairment covariance matrix based on said improved estimate for said scaling parameters.

* * * * *

UNITED STATES PATENT AND TRADEMARK OFFICE
CERTIFICATE OF CORRECTION

PATENT NO. : 8,503,508 B2
APPLICATION NO. : 12/743727
DATED : August 6, 2013
INVENTOR(S) : Larsson Page 1 of 1

It is certified that error appears in the above-identified patent and that said Letters Patent is hereby corrected as shown below:

In the Specification:

In Column 7, Line 65, in Equation (19), delete " $Ee_i^T(\hat{R}_m - R)e_j e_k^T(\hat{R}_m - R)e_r =$ " and insert -- $Ee_i^T(\hat{R}_m - R)e_j e_q^T(\hat{R}_m - R)e_r =$ --, therefor.

In the Claims:

In Column 11, Line 6, in Claim 7, delete "Σ" and insert -- $\hat{\Sigma}$ --, therefor.

Signed and Sealed this
Twelfth Day of May, 2015

Michelle K. Lee
*Director of the United States Patent and Trademark Office*